UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

PRODUCTION OF METALLIC THORIUM.

1,085,098. Specification of Letters Patent. Patented Jan. 27, 1914.

No Drawing. Application filed June 16, 1905. Serial No. 265,554.

*To all whom it may concern:*

Be it known that I, WILLIAM C. ARSEM, a citizen of the United States, residing at Schenectady, county of Schenectady, State of New York, have invented certain new and useful Improvements in the Production of Metallic Thorium, of which the following is a specification.

This invention relates to the production of thorium compounds, and to the reduction of pure thorium from such compounds in a condition suitable for the manufacture of filaments for incandescent lamps.

I am aware that it has been proposed to utilize thorium oxid as a coating for carbon filaments in incandescent lamps, but I am not aware that filaments of pure thorium have ever been made, and furthermore I do not believe the mechanical and chemical difficulties of such an operation have ever been overcome prior to the invention herein described.

Heretofore thorium has been prepared by the following process: Thorium dioxid was converted into thorium sulfate by heating with concentrated sulfuric acid. The hydroxid was precipitated from the purified sulfate by ammonia, and dissolved in hydrochloric acid. A solution of potassium chlorid was added, the whole evaporated to dryness and the residue finally dried at redness in hydrochloric acid gas. The potassium thorium chlorid thus prepared was subsequently reduced by sodium in a closed iron cylinder yielding thorium. The metal was washed repeatedly with water and then with alcohol and ether and dried at 100° centigrade. When prepared as above described the metal is in the form of a grayish-white glistening powder consisting of small thin six-sided leaflets. It is in a form quite unsuited for the manufacture of incandescent lamp filaments, because it contains many impurities, among which the following may be mentioned; thorium dioxid,—present in the salt used for reduction; thorium hydrid—formed by combination of thorium with hydrogen set free from sodium which always contains notable quantities of it; thorium hydroxid and basic salts—formed during lixiviation of the reaction mixture by interaction of unchanged thorium chlorid with sodium hydroxid from the excess of sodium.

By the process hereinafter described I am able to produce metallic thorium free from the impurities above named and in a condition such that it may be hammered and drawn or otherwise manipulated to produce lamp filaments of any desired size and shape.

In carrying out my process I convert thorium dioxid into thorium tetrachlorid, and this salt I subsequently reduce by an excess of sodium in a vacuum. The metallic thorium thus produced is suitably purified by washing and then agglomerated and compressed into a dense metallic state after which it may be rolled and drawn into wire.

My process comprises three more or less distinct steps,—first the formation of anhydrous thorium tetrachlorid from thorium dioxid. Second, the reduction of thorium tetrachlorid to isolate metallic thorium and third, the agglomeration of the thorium powder to produce lamp filaments.

In carrying out the first step of this process I heat thorium dioxid in the vapor of sulfur monochlorid at a temperature somewhat below the melting point of thorium tetrachlorid until the reaction is ended. The sulfur chlorid vapor in the apparatus is then displaced by dry hydrogen chlorid and this in turn by dry hydrogen, in which the thorium tetrachlorid is allowed to cool. The reaction is:

$$ThO_2 + 2S_2Cl_2 = SO_2 + 3S + ThCl_4.$$

Thorium tetrachlorid is thus formed *in situ*, while sulfur and sulfur dioxid pass off. The operation may be conducted at a bright red heat which is considerably below the temperature of sublimation of the $ThCl_4$. To insure a product free from oxid or oxychlorid the product of this first treatment may be ground and again put through the same process. The resulting chlorid is in small white crystals resembling table salt and is moderately hygroscopic. An analysis of a typical sample gave:

|  | Found. | Calculated. |
|---|---|---|
| Chlorin | 37.47 | 37.89 |
| Thorium | 62.67 | 62.11 |
|  | 100.14 | 100.00 |

The second step in my process consists in the reduction of $ThCl_4$ by sodium. This process is effected in a steel crucible heated in a vacuum furnace of the type shown in United States Patent No. 785,535, issued to me March 21, 1905. The crucible is degasified when first used, by heating *in vacuo* two hours at 1100° to 1200° centigrade and the sodium used in the process is purified by fusion under xylene. The sodium may be allowed to solidify under xylene, and is then transferred directly to the crucible without drying; the volatile hydrocarbon escapes during the first stages of the heating before reduction takes place. I find it desirable in charging the crucible to add a certain amount of potassium chlorid as the latter forms an easily fusible mixture with the sodium chlorid produced during the reaction. This mixture then serves to flux the high melting thorium chlorid and bring it into contact with the sodium. The addition of a small piece of the double salt KCl.NaCl is desirable to assist in starting the fusion of a low temperature. I may also cover the charge in the crucible with a layer of potassium chlorid to prevent access of moisture to the substances below during the time necessary to get the crucible in position and to exhaust the furnace. After exhausting the furnace in the manner described in the above named patent, the temperature is raised to about 700° centigrade, and maintained at that value for approximately one hour. During the heating, considerable gas is evolved which is pumped out as fast as liberated. Toward the end of the reaction the temperature may be gradually raised to distil the excess of alkali metal out of the reaction mixture and thus prevent it from remaining alloyed with the thorium. After cooling the mixture of thorium and salts may be removed without difficulty from the crucible for subsequent treatment. The mixture contains thorium, sodium chlorid, thorium chlorid (unreduced) and sodium hydroxid from sodium condensed on the walls of the crucible. A preliminary treatment with cold water will remove most of the alkali salts and some of the thorium chlorid. At the same time, some thorium hydroxid may be precipitated by interaction of sodium hydroxid and thorium chlorid; this remains temporarily with the thorium. After repeated treatment with boiling water and decantation the remaining thorium hydroxid may be removed by treatment with nitric acid (diluted 1:1) at 100° centigrade for one hour. The metal is finally washed with boiling water, alcohol and acetone in succession and dried at 100° centigrade on a water bath. The resultant metal is a light crystalline powder, rather coarse grained and soft and having an exceedingly high melting point. It ignites below redness when heated in air, with the formation of $ThO_2$. The third step in my process consists in the agglomeration of this coarse grained powder into a compact state which may be effected as follows: A mixture of thorium powder, with the addition of 20 to 100 per cent. of its weight of clean magnesium filings is compressed into a lump and heated in a magnesia crucible in the vacuum furnace (United States Patent #785,535) until the magnesium has all vaporized. I find that after this operation there remains behind a somewhat porous sintered mass which after treatment with nitric acid, washing and drying, can be compressed into a dense metallic state, somewhat resembling copper in malleability and in proper condition to be rolled and drawn into wire.

Although I do not wish to be limited to any particular theory for the action above described, I believe that during the heating, an alloy of thorium and magnesium is temporarily formed, either before or during the vaporizing of the magnesium, and that this causes the grains or crystals of thorium to be cemented together. Whatever the principle may be which underlies this step of my improved process I find that by the operation above described, I am able to form a lamp filament from thorium powder without actual fusion of the powder, and that I can thereby obtain a filament of pure thorium of good mechanical strength and high lighting efficiency.

What I claim as new and desire to secure by Letters Patent of the United States, is:—

1. The process which consists in changing a thorium compound to thorium tetrachlorid, reducing this tetrachlorid with an alkali metal to separate metallic thorium in a finely divided condition, and agglomerating this finely divided thorium into a compact body.

2. The process which consists in producing thorium tetrachlorid, reducing said tetrachlorid with an alkali metal to obtain metallic thorium in a finely divided condition, and agglomerating this finely divided thorium.

3. The process which consists in converting thorium dioxid to thorium tetrachlorid, reducing the tetrachlorid with sodium to obtain metallic thorium in a finely divided condition, and consolidating this finely divided thorium into a compact, coherent body.

4. The process of obtaining pure metallic thorium which consists in heating thorium tetrachlorid with an alkali metal in an inert environment.

5. The process of obtaining pure metallic thorium which consists in heating a halogen compound of thorium with a metallic reducing agent in a maintained vacuum.

6. The process which consists in reducing a thorium compound with an alkali metal in an inert environment thereby obtaining thorium in powdered form and heating said powder in contact with magnesium in a vacuum to the vaporizing temperature of magnesium for a length of time sufficient to distil magnesium from the mixture and then compressing the resulting sintered thorium residue into a dense mass.

7. The process which consists in reducing a thorium compound with an alkali metal in a maintained vacuum to obtain metallic thorium in a powdered state and then agglomerating the powdered thorium by heat treatment in contact with metallic magnesium.

8. The process of obtaining pure, malleable, ductile, metallic thorium which consists in heating a mixture of anhydrous thorium tetrachlorid and dry metallic sodium in contact with a flux of potassium and sodium chlorid in a maintained vacuum to a temperature of about 700° C. thereby producing thorium powder and then agglomerating this powder into a compact, coherent body.

9. The process which consists in heating anhydrous thorium tetrachlorid in contact with a flux and a reducing metal in a maintained vacuum to a temperature of about 700° C. until said chlorid has been reduced with a formation of metallic thorium.

In witness whereof I have hereunto set my hand this 14th day of June, 1905.

WILLIAM C. ARSEM.

Witnesses:
BENJAMIN B. HULL,
HELEN ORFORD.